United States Patent
Ishihara (10) Patent No.: US 11,132,205 B2
(45) Date of Patent: Sep. 28, 2021

(54) ELECTRONIC CONTROL DEVICE

(71) Applicant: Mitsubishi Electric Corporation, Tokyo (JP)

(72) Inventor: Kentaro Ishihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 16/598,163

(22) Filed: Oct. 10, 2019

(65) Prior Publication Data
US 2020/0142707 A1 May 7, 2020

(30) Foreign Application Priority Data
Nov. 6, 2018 (JP) .............................. JP2018-208755

(51) Int. Cl.
| | |
|---|---|
| G06F 9/44 | (2018.01) |
| G06F 9/38 | (2018.01) |
| G05B 19/042 | (2006.01) |
| G06F 9/448 | (2018.01) |
| G06F 9/4401 | (2018.01) |
| G06F 9/445 | (2018.01) |

(52) U.S. Cl.
CPC ....... G06F 9/3885 (2013.01); G05B 19/0426 (2013.01); G06F 9/3857 (2013.01); G06F 9/4403 (2013.01); G06F 9/445 (2013.01); G06F 9/4482 (2018.02)

(58) Field of Classification Search
CPC ....................................................... G06F 9/44
See application file for complete search history.

(56) References Cited

U.S. PATENT DOCUMENTS

| | | | | |
|---|---|---|---|---|
| 5,317,540 A * | 5/1994 | Furuyama | ................ | G11C 8/04 |
| | | | | 365/189.14 |
| 8,312,182 B2 * | 11/2012 | Toyohara | .............. | G06F 12/109 |
| | | | | 710/33 |
| 8,533,716 B2 * | 9/2013 | Lippett | ................. | G06F 9/4812 |
| | | | | 718/100 |

FOREIGN PATENT DOCUMENTS

JP 2015-171008 A 9/2015

* cited by examiner

*Primary Examiner* — Jae U Jeon
(74) *Attorney, Agent, or Firm* — Sughrue Mion, PLLC; Richard C. Turner (57) ABSTRACT

An electronic control device is configured to execute processing unit execution operation while executing processing part activation operation. In the processing part activation operation, the activation main processing is performed separately on each of a plurality of processing parts included in a control program, and a start address of a processing unit that is included in a processing part for which the activation main processing has been completed is switched from invalid to valid, in ascending order of the lengths of activation time demanded of the processing parts to be ready for execution. In the processing unit execution operation, a processing unit that is associated with a start address switched to valid is executed.

6 Claims, 4 Drawing Sheets

ELECTRONIC CONTROL DEVICE

BACKGROUND OF THE INVENTION

1. Field of the Invention

The present invention relates to an electronic control device configured to execute a control program.

2. Description of the Related Art

An electronic control device called an electronic control unit (ECU) is used to execute processing of controlling a control object by driving a motor driving inverter, which is used to drive a motor, or an illumination driving converter, which is used to control light emission and driving of a light source.

The ECU is configured so as to be capable of executing, in addition to the processing of controlling a control object, an exchange of information with an external device or cooperating operation among a plurality of control objects, through various communication lines.

In recent years, an advanced security measure for the ECU is being taken. Specifically, processing of examining the validity of a control program is executed as activation main processing before the starting of the ECU's original processing, such as control of respective units and execution of communication through the execution of the control program. Whether the control program has been falsified and other verifications can be conducted by executing the activation main processing.

The scale of a control program is also increasing as various demands about control by the ECU increase in number. The verification of the validity of the control program therefore tends to take a long time in proportion to the scale of the control program.

A resultant problem is that the time demanded for the activation of the control program, namely, an activation time of the control program, is difficult to secure. This problem is addressed by Japanese Patent Application Laid-open No. 2015-171008, in which a technology related to the shortening of an activation time is disclosed.

In Japanese Patent Application Laid-open No. 2015-171008, there is proposed a method of reducing the overall activation time of a system, which includes a plurality of central processing units (CPUs), and is configured to execute the processing of verification of the validity of a control program by using only a specific one of the plurality of CPUs, which includes the verification processing to be otherwise executed by the rest of the plurality of CPUs.

With the ECU, however, the activation time of a control program is short. There is accordingly a wait for the completion of the activation main processing when the method described in Japanese Patent Application Laid-open No. 2015-171008 is applied to the ECU, and an effect of fulfilling the demand about the activation time cannot be expected.

SUMMARY OF THE INVENTION

The present invention has been made to solve the problem described above, and an object of the present invention is therefore to provide an electronic control device capable of preventing an increase of the time required for a control program to be ready for execution when the control program is to be executed after activation main processing is performed on the control program.

According to at least one embodiment of the present invention, there is provided an electronic control device including: a first storage configured to store a control program including a plurality of processing parts; a second storage configured to store a start address array including, as an element, a start address of at least one processing unit included in each of the plurality of processing parts; and a controller configured to execute the control program, wherein the plurality of processing parts are arranged in ascending order of lengths of activation time demanded of the plurality of processing parts to be ready for execution, and wherein the controller is configured to execute processing unit execution operation while executing processing part activation operation, the processing part activation operation including performing activation main processing for each of the plurality of processing parts, and switching the start address of each processing unit that is included in one of the processing parts for which the activation main processing has been completed from invalid to valid, in the order of arrangement of the plurality of processing parts, the processing unit execution operation including referring to the start address array and executing the processing unit that has the start address switched to valid.

According to the present invention, an electronic control device capable of preventing an increase of the time required for a control program to be ready for execution when the control program is to be executed after activation main processing is performed on the control program can be provided.

DESCRIPTION OF THE EMBODIMENTS

An electronic control device according to at least one embodiment of the present invention is described below with reference to the drawings. Throughout the drawings, the same component is denoted by the same reference symbol.

First Embodiment

Figure 1:
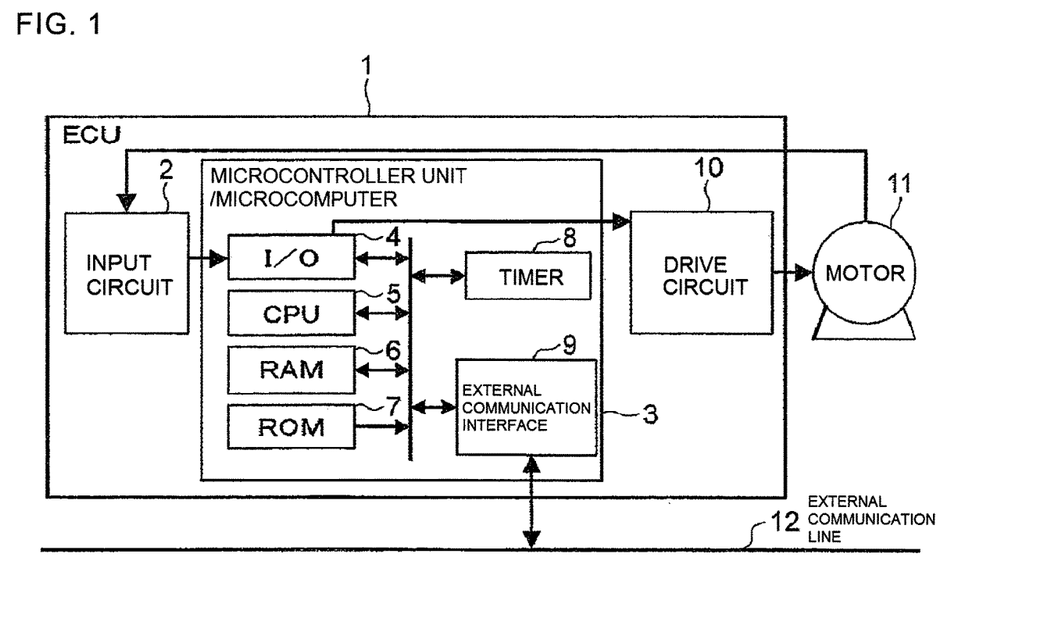
FIG. 1 is a block diagram for illustrating an example of a configuration of an electronic control device according to a first embodiment of the present invention.

FIG. 1 is a block diagram for illustrating a configuration example of an electronic control device according to a first embodiment of the present invention.

An ECU 1, which is the electronic control device according to the first embodiment of the present invention, is illustrated in FIG. 1 along with a motor 11, which is driven by the ECU 11. "ECU" stands for electronic control unit, and is a collective term for electronic control devices. The ECU 1 is used as an in-vehicle control device configured to control in-vehicle electrical components in some cases.

The ECU 1 illustrated in FIG. 1 includes an input circuit 2, a microcontroller unit/microcomputer 3, and a drive circuit 10. The ECU 1 controls the motor 11, and is configured to be capable of holding communication to and from an external device (not shown) through an external communication line 12.

The input circuit 2 reads a signal from the outside, or a sensor signal from the motor 11, which is a control object, as a voltage, and notifies the read voltage to the microcontroller unit/microcomputer 3.

The microcontroller unit/microcomputer 3 operates as a control unit inside the ECU 1. The microcontroller unit/microcomputer 3 includes an input/output (I/O) 4, a central processing unit (CPU) 5, a random access memory (RAM) 6, a read-only memory (ROM) 7, a timer 8, and an external communication interface 9.

The I/O 4 inputs and outputs a digital signal. Specifically, the I/O 4 takes a voltage read by the input circuit 2 into the microcontroller unit/microcomputer 3, and outputs a control signal to the drive circuit 10.

The CPU 5 is a controller configured to control the components of the microcontroller unit/microcomputer 3. The CPU 5 is capable of executing activation processing 70 and a control program 71, which are stored in the ROM 7. The CPU 5 is also capable of executing, when an interrupt occurs during the execution of the control program 71, processing relevant to the interrupt. The CPU 5 may have a single core or a plurality of cores for arithmetic processing inside the CPU 5, as long as access to the I/O 4, the RAM 6, the ROM 7, the timer 8, and the external communication interface 9 is possible. The CPU 5 may also include a plurality of CPUs.

The RAM 6 is a storage that is accessible from the CPU 5 and that stores data in a rewritable state. The contents of data to be stored in the RAM 6 are described later in detail. The ROM 7 is a storage for storing data in such a manner that allows only the reading of the data. The ROM 7, however, may be a type of storage that allows data to be rewritten, such as an erasable programmable read-only memory (EPROM). The contents of data to be stored in the ROM 7 are described later in detail. The ROM 7 and the RAM 6 may serve as a first storage and a second storage, respectively.

The timer 8 generates various timing signals in response to a request from the CPU 5. The external communication interface 9 is used when communication to and from another device is held. The external communication interface 9 is configured to be capable of holding communication to and from an external device through the external communication line 12 based on various communication standards, such as communication standards for a controller area network (CAN) or a CAN with flexible data-rate (CAN FD), FlexRay, or communication standards for the Ethernet (a trademark). The external communication interface 9 may hold communication to and from an external device by wireless communication.

The drive circuit 10 generates a motor drive signal in response to an instruction received from the microcontroller unit/microcomputer 3, and supplies the motor drive signal to the motor 11. The ECU 1 drives the motor 11 in the specific example described in the first embodiment, but the configuration of the ECU 1 is not limited to this specific example. For instance, a light emitting diode (LED) or a similar light source may be an object to be controlled by the drive circuit 10, and the ECU 1 may perform illumination control of the LED.

Figure 2:
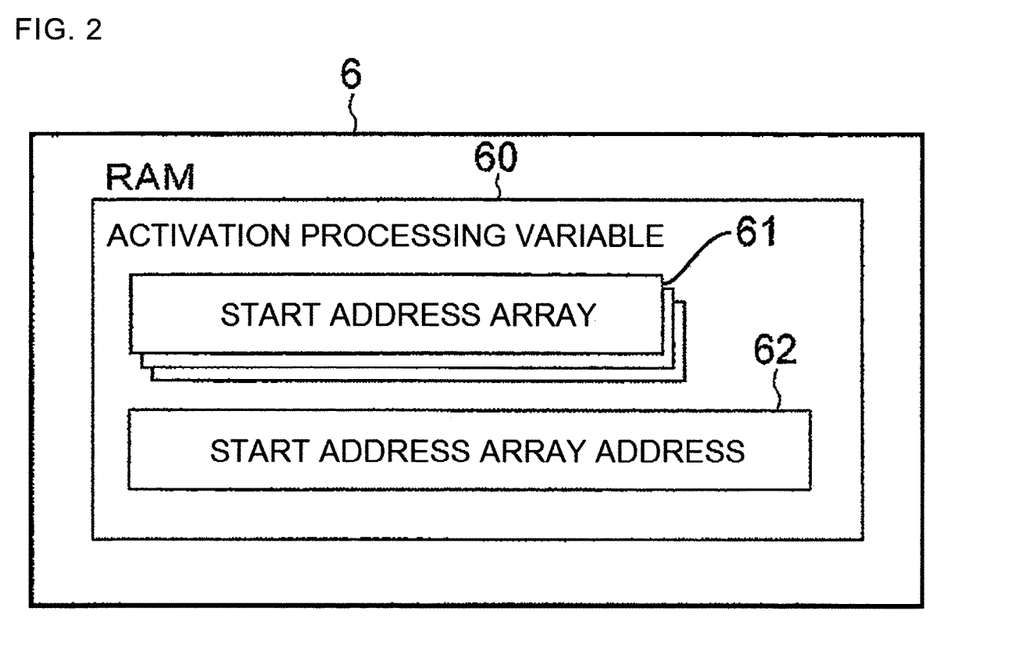
FIG. 2 is an explanatory diagram for illustrating an example of contents of an activation processing variable stored in a RAM in the first embodiment of the present invention.

The RAM 6 is described next with reference to FIG. 2. FIG. 2 is an explanatory diagram for illustrating an example of the contents of an activation processing variable 60, which is stored in the RAM 6 in the first embodiment of the present invention.

In the first embodiment, the RAM 6 stores, as the activation processing variable 60, a start address array 61 and a start address array address 62. The start address array 61 has, as an element, a start address of at least one processing unit that is contained in each of a plurality of processing parts of the control program 71 described later. The start address array address 62 is a start address of the start address array 61. The start address array 61 is an array of static variables that stores, as a start address, an address at the head of each processing unit included in the control program 71, which is stored in the ROM 7.

The start address array 61 accordingly includes the start address of each processing unit as an element. The start address array 61 stores, as a start address, an address at the head of a processing unit when the processing unit is executable, and an invalid address in the case of an inexecutable processing unit. The processing units are described later in detail.

The start address array address 62 is a static variable indicating, as a start address, an address at the head of the start address array 61. As the start address array address 62, a valid address is stored until activation main processing 702 is completely finished, and an invalid address is stored once the activation main processing 702 is completely finished.

Although omitted from FIG. 2, the RAM 6 has a work area in which input/output data, a variable, or the like that is required for each processing procedure is read and written when the execution of the control program 71 starts. The work area is placed in advance such that an overlap with an area in which the start address array 61 and the start address array address 62 are placed is avoided.

Figure 3:
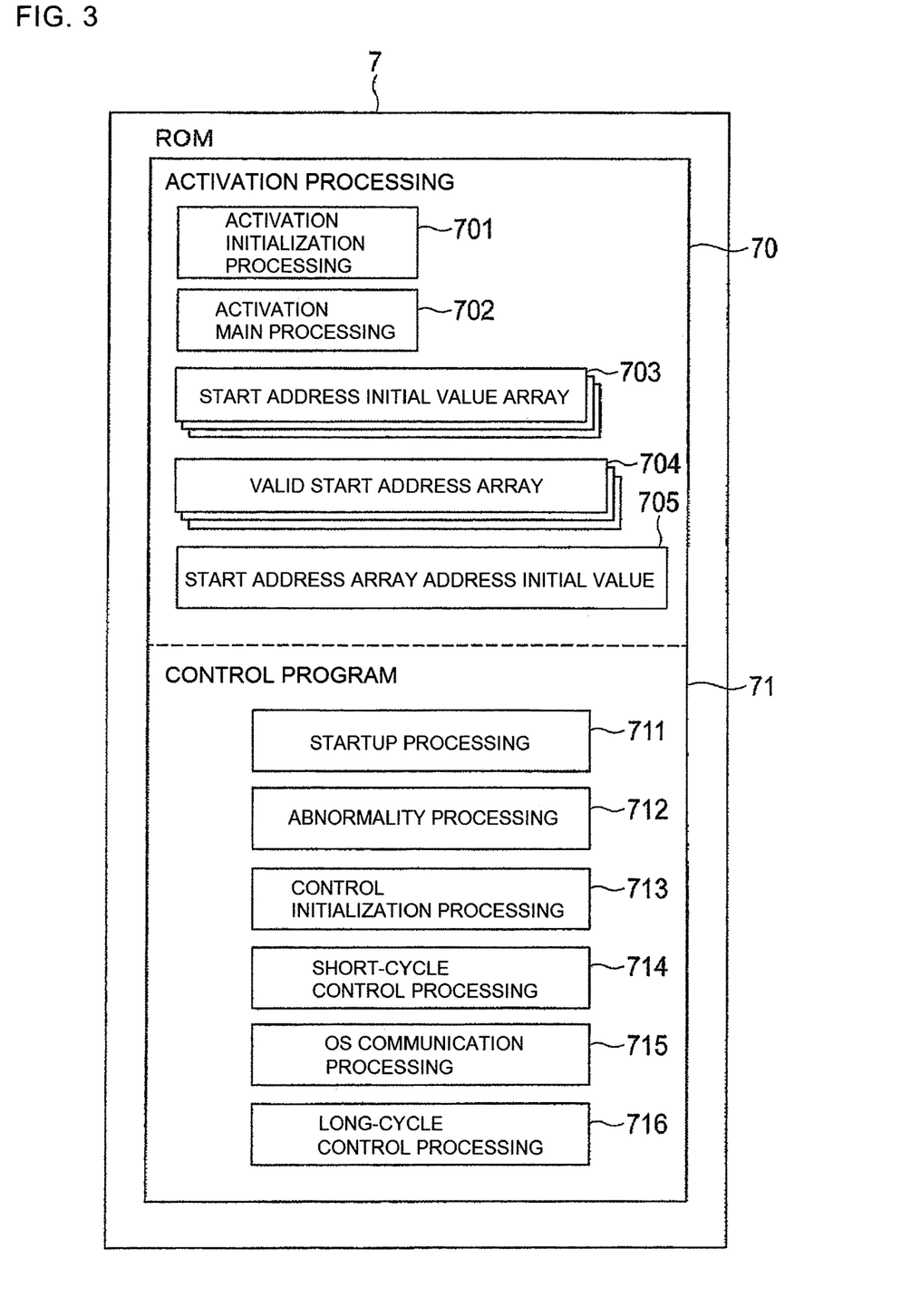
FIG. 3 is an explanatory diagram for illustrating an example of contents of activation processing and a control program that are stored in a ROM in the first embodiment of the present invention.

The ROM 7 is described next with reference to FIG. 3. FIG. 3 is an explanatory diagram for illustrating an example of the contents of the activation processing 70 and the control program 71, which are stored in the ROM 7 in the first embodiment of the present invention.

The activation processing 70 includes activation initialization processing 701, the activation main processing 702, a start address initial value array 703, a valid start address array 704, and a start address array address initial value 705.

The activation initialization processing 701 is an initialization part in the activation processing 70 required before the execution of the control program 71. The activation main processing 702 is main processing in the activation processing 70 required before the execution of the control program 71. The activation main processing 702 corresponds to, for example, check processing or transfer processing. The check processing is processing of examining the validity of the control program 71. The transfer processing is processing of transferring the control program 71 to a required area.

The activation main processing 702, which is the processing of examining the validity of the control program 71 and is accordingly important in terms of security, may be stored in an area of the ROM 7 that is protected with security measures and separated from the rest of areas of the ROM 7. The activation initialization processing 701, too, may be stored in the area of the ROM 7 that is protected with security measures and separated from the rest of areas of the ROM 7 because each part is required to be initialized properly.

The start address initial value array 703 stores the initial value of a start address of each element included in the start address array 61. The start address initial value array 703 is for initializing the start address array 61. An address value stored as each element of the start address initial value array 703 is accordingly the initial value of an element that is at the same position in the start address array 61 as the position of the element in the start address initial value array 703.

The valid start address array 704 stores a valid start address of each element included in the start address array 61. The start address array address initial value 705 stores the initial value of the start address array address 62.

In the first embodiment, it is required to prevent the execution of a processing unit included in a processing part that is one of the processing parts of the control program 71 described later and that has not finished being processed by the activation main processing 702. An invalid address is accordingly stored for this processing unit in the start address initial value array 703. A specific example of the invalid address is "NULL" in the C language.

When abnormality is detected during the execution of one of processing units included in a processing part of the control program 71, or in a similar case, the execution of another processing unit may be required in order to take temporary action to deal with the abnormality or store the contents of the abnormality. For a processing unit required in the event of abnormality, a start address of temporary execution processing is stored in advance as an element of the start address initial value array 703.

The control program 71 is described below with reference to FIG. 3. The control program 71 includes, as a plurality of processing parts divided by the contents of processing, startup processing 711, abnormality processing 712, control initialization processing 713, short-cycle control processing 714, operating system (OS) communication processing 715, and long-cycle control processing 716.

The startup processing 711 to the long-cycle control processing 716 as processing parts each include at least one processing unit. The "processing unit" means a sub-routine, and ends processing with a return command, which is a command to return the processing to a caller. An example of the processing unit is a cohesive block of processing called a "function" in the C language. Each processing unit is assigned a unique processing unit identification (ID) as an ID for discriminating one processing unit from another.

The processing unit ID is assigned to a processing unit such that a start address of the processing unit is retrieved by referring to the valid start address array 704 with the processing unit ID as an index. The processing unit ID is also assigned to a processing unit by referring to the start address array 61 with the processing unit ID as an index yields a valid start address when the processing unit is executable, and an invalid address when the processing unit is inexecutable.

The startup processing 711 to the long-cycle control processing 716, which are processing parts of the control program 71, are arranged in ascending order of the lengths of activation time demanded of the processing parts to be ready for execution. In other words, the processing parts are arranged such that a processing part for which the activation main processing 702 is performed first has the smallest address in order to perform the activation main processing 702 on the processing parts in ascending order of the lengths of activation time demanded of the processing parts.

The processing parts may be arranged by, for example, defining names for sections in which the startup processing 711 to the long-cycle control processing 716 as processing parts of the control program 71 are to be placed, compiling the processing parts, and specifying start addresses of the sections of the processing parts to a linker program, which executes processing of linking programs.

The startup processing 711 involves basic initialization to start the control program 71, including the initialization of a stack pointer, the setting of the initial value of a variable in the program, and the like. A built-in self-test (BIST), which is a self-test function included in the microcontroller unit/ microcomputer 3, may be implemented in the startup processing 711 when the execution of BIST is required. This means that the startup processing 711 is required to perform various types of initialization processing and is accordingly arranged as a processing part required to be executed first in the control program 71.

The abnormality processing 712 involves action required to be taken to deal with abnormality that is detected during the execution of the processing parts of the control program 71. That is, when abnormality is detected in one of the control initialization processing 713 to the long-cycle control processing 716, action required to deal with the abnormality is taken by the abnormality processing 712. As illustrated in FIG. 3, the processing parts are accordingly arranged such that the execution of the abnormality processing 712 is started before the control initialization processing 713 to the long-cycle control processing 716.

The control initialization processing 713 involves initialization required to execute processing of controlling a control object. For instance, variables required for various types of control processing of the control program 71 and a function required to control the motor 11 are initialized in the control initialization processing 713.

An analog-to-digital (A/D) conversion function with which the voltage of a sensor is converted into a digital value, and a pulse width modulation (PWM) function with which a control signal in the drive circuit 10 is adjusted, for example, are initialized as initialization required for input/ output relevant to the control of the motor 11. This and other types of initialization by the control initialization processing 713 is required to be executed before the execution of the short-cycle control processing 714 is started. As illustrated in FIG. 3, the processing parts are accordingly arranged such that the execution of the control initialization processing 713 is started before the short-cycle control processing 714.

The short-cycle control processing 714 is a part of control processing that involves processing of controlling the motor 11 in a cycle shorter than the cycle of the long-cycle control processing 716, which is described later, and is one of main functions of the ECU 1. The short-cycle control processing 714 performs control in a cycle of, for example, several ten microseconds to several hundred microseconds and, as illustrated in FIG. 3, the processing parts are arranged such that the execution of the execution of the short-cycle control processing 714 is started before the OS communication processing 715 in order to detect abnormality in processing or abnormality in a control object as early as possible.

The OS communication processing 715 involves processing of holding communication to and from the outside when a real-time OS is incorporated in the control program 71 and processing of holding communication to and from various in-vehicle devices is executed on the OS. The use of the real-time OS is not requisite and, when the real-time OS is not used, the timer 8 is used to create an execution cycle of the processing of holding communication to and from the outside.

A specific length of activation time is demanded of the function of holding communication to and from the outside in the OS communication processing 715, because the ECU 1 is required to operate cooperatively with another ECU that is an external device. As illustrated in FIG. 3, the processing parts are arranged such that the execution of the OS communication processing 715 is started before the long-cycle control processing 716 in order to allow the processing of holding communication to and from the outside to start within the demanded specific length of time.

The long-cycle control processing 716 is a processing part of control processing that involves control performed in a longer cycle than the cycle of the short-cycle control processing 714 described above. The long-cycle control processing 716 is control processing executed in a cycle of, for example, 1 millisecond or longer, and involves various types of processing such as the monitoring of processing parts for abnormality and the issuing of a control command to the short-cycle control processing 714. In other words, the long-cycle control processing 716 involves various types of processing that are demanded to have a relatively long activation time in the control program 71, or for which no particular activation time is set down and, as illustrated in FIG. 3, is placed at the tail end of the arranged processing parts of the control program 71.

In the first embodiment, the control program 71 is divided into processing parts that are the startup processing 711, the abnormality processing 712, the control initialization processing 713, the short-cycle control processing 714, the OS communication processing 715, and the long-cycle control processing 716 only for the purpose of giving a specific description. The granularity at which the control program 71 is divided into processing parts and the number of processing parts into which the control program 71 is to be divided are therefore not limited to the specific example of the first embodiment. The contents of the processing parts of the control program 71 are not limited to the specific example of the first embodiment either.

When the first embodiment is not applied and another processing unit that is a sub-routine or the like is called up, the control program 71 invariably jumps to a start address of the call target processing and starts executing the processing unit.

However, static binding that requires all processing parts of the control program 71 to be present in a memory space of the CPU 5 and available for calling at the start of execution is applied to the control program 71 of the ECU 1. This causes a problem in that the ECU 1 does not have a function of setting only processing units that are included in processing parts for which the activation main processing 702 has been completed as available for calling and setting processing units that are included in processing parts for which the activation main processing 702 has not been completed as unavailable for calling, when the activation main processing 702 is completed for only some of the processing parts of the control program 71.

In short, the control program 71 to which the first embodiment is applied is executable on a processing unit-by-processing unit basis in some cases and is inexecutable on a processing unit-by-processing unit basis in other cases, depending on the progress of the activation main processing 702. The CPU 5 accordingly refers to, before calling up and executing another processing unit, a start address stored as one of the elements of the start address array 61 that is associated with the processing unit to be called up, and determines whether the start address is valid. The CPU 5 permits the calling up and execution of the another processing unit only when the start address of the processing unit to be called up is determined as a valid address.

The CPU 5 is enabled to determine, for each processing unit, whether the start address of the processing unit is valid or invalid, by, for example, assigning processing unit IDs in advance in ascending order of start addresses of processing units in the control program 71. The start address array 61 is then configured such that a start address of the processing unit is stored as an element indicated by the processing unit ID of the processing unit.

A description is given below on how basic processing progresses in the activation processing 70 and the control program 71, an example of which is illustrated in FIG. 3, at the time of activation of the ECU 1 when the first embodiment is applied.

When the ECU 1 is activated and a reset state of the microcontroller unit/microcomputer 3 is canceled, the CPU 5 executes the activation initialization processing 701 as the first step of the activation processing 70. The activation initialization processing 701 involves processing of initializing components of the microcontroller unit/microcomputer 3 that are required to execute the activation main processing 702.

More specifically, as the activation initialization processing 701 in the first embodiment, the CPU 5 transfers elements of the start address initial value array 703 to the start address array 61 and thus initializes the start address array 61. The CPU 5 similarly transfers the contents of the start address array address initial value 705 to the start address array address 62, and thus initializes the start address array address 62. The CPU 5 also initializes pieces of hardware and software that are required in the activation main processing 702 described later.

The CPU 5 next performs the activation main processing 702 on the processing parts. In the first embodiment, secure boot processing is performed as the activation main processing on the processing parts. The validity is examined in the secure boot processing for each processing unit of the control program 71 stored in the ROM 7.

The secure boot processing uses an authentication key, an electronic signature, or the like to verify that the control program 71 has not been falsified. In the first embodiment, as the execution of the activation main processing 702 is advanced on a processing part-by-processing part basis, processing units included in a processing part for which the activation main processing 702 has been completed are sequentially rendered executable. This is accomplished by advancing the activation main processing 702 in stages through a procedure illustrated in FIG. 4.

Figure 4:
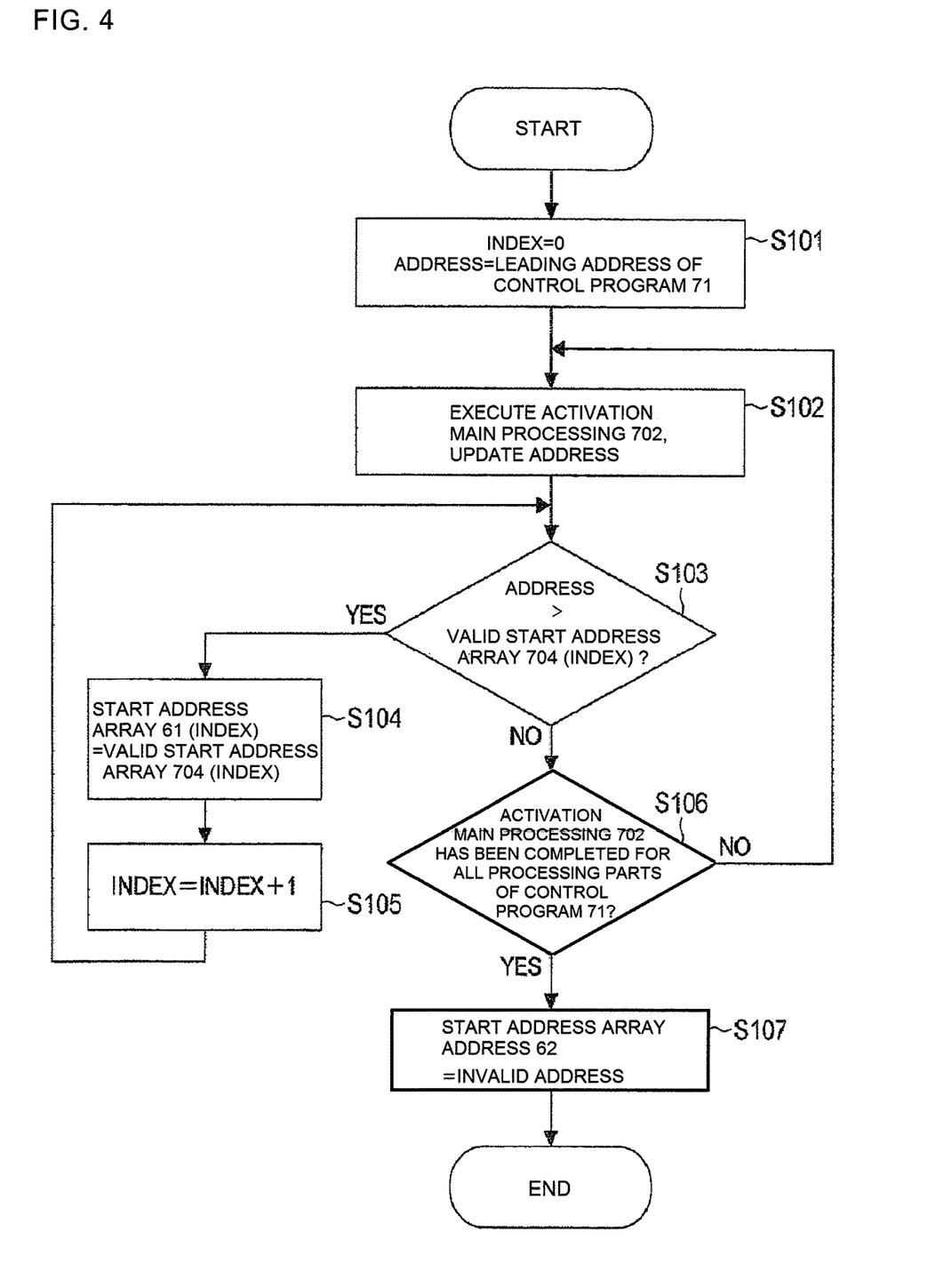
FIG. 4 is a flow chart for illustrating a processing procedure of activation main processing in the first embodiment of the present invention.

The activation main processing 702 is described below with reference to FIG. 4. FIG. 4 is a flow chart for illustrating a processing procedure of the activation main processing 702 in the first embodiment of the present invention.

In Step S101, the CPU 5 declares INDEX as an automatic variable, and initializes INDEX to zero in order to start access from the head of the start address array 61. "INDEX" here is an index used by the CPU 5 to access elements in the start address array 61 and in the valid start address array 704.

The CPU 5 also declares in Step S101 ADDRESS as an automatic variable and initializes ADDRESS to the leading address of the control program 71 to start the activation main processing 702 from the leading address of the control program 71. "ADDRESS" here is the last address of processing parts for which the activation main processing 702 has been completed. INDEX and ADDRESS are declared as automatic variables in the RAM 6 and are not secured at specific addresses in the RAM 6. INDEX and ADDRESS are accordingly not included in the activation processing variable 60.

In Step S102, the CPU 5 performs the activation main processing 702 on a processing part that is indicated by ADDRESS at that point. In the first embodiment, the activation main processing 702 is executed one processing part out of the processing parts included in the control program 71, namely, the startup processing 711 to the long-cycle control processing 716, at a time, instead of being performed on all areas of the control program 71 at once.

As an example, the control program 71 in the first embodiment is divided into a plurality of processing parts by the contents of processing, and processing parts required to be activated out of the startup processing 711 to the long-cycle control processing 716 are arranged in ascending order of the lengths of activation time demanded of the processing parts to be ready for execution. The CPU 5 accordingly advances the activation main processing 702 with each processing part out of the startup processing 711 to the long-cycle control processing 716 as one section. Each time the activation main processing 702 is completed for one processing part, the CPU 5 updates ADDRESS to the start address of the next processing part. The processing of FIG. 4 then proceeds to Step S103.

In Step S103, the CPU 5 obtains one of the elements of the valid start address array 704 that is indicated by INDEX, namely, the start address of a processing unit. The CPU 5 determines whether ADDRESS exceeds the obtained element. When it is determined that ADDRESS does not exceed the element of the valid start address array 704 that is indicated by INDEX, it means that no processing unit has newly become executable by the activation main processing 702 in Step S102. The processing of FIG. 4 accordingly proceeds to Step S106.

When it is determined in Step S103 that ADDRESS exceeds the element of the valid start address array 704 that is indicated by INDEX, on the other hand, the processing of FIG. 4 proceeds to Step S104.

In Step S104, the CPU 5 stores the element of the valid start address array 704 that is indicated by INDEX as one of elements of the start address array 61 that is indicated by INDEX, because the activation main processing 702 has been completed for sections up through the start address that is the element obtained in Step S103. This action of the CPU 5 is equivalent to switching the start address of a processing unit that has newly become executable by the activation main processing 702 from invalid to valid. The processing of FIG. 4 then proceeds to Step S105. In Step S105, the CPU 5 updates INDEX such that the next element, namely, the start address of the next processing unit, is indicated by INDEX.

The completion of the activation main processing 702 for one processing part usually turns at least one processing unit in the processing part executable. The CPU 5 accordingly executes the determination of Step S103 again after processing of Step S105 is completed. The CPU 5 repeatedly executes Step S103 to Step S105 until one of the elements of the valid start address array 704 that is indicated by INDEX exceeds ADDRESS.

In Step S106, the CPU 5 evaluates the value of ADDRESS, to thereby determine whether the activation main processing 702 has been completed for all processing parts. When it is determined in Step S106 that not all processing parts have been processed by the activation main processing 702, the processing of FIG. 4 returns to Step S102.

As is understood from Step S102 to Step S106 described above, the CPU 5 executes processing part activation operation in which the activation main processing 702 is performed on each of the startup processing 711 to the long-cycle control processing 716 separately, and the start address of a processing unit included in a processing part for which the activation main processing 702 has been completed is switched from invalid to valid in the order of arrangement of the processing parts.

When it is determined in Step S106 that the activation main processing 702 has been completed for all processing parts, on the other hand, the processing of FIG. 4 proceeds to Step S107. In this case, processing units included in all processing parts of the control program 71 are executable, and reference to the start address array 61 for the purpose of checking whether processing is executable is no longer required. The CPU 5 accordingly stores an invalid address as the start address array address 62 in Step S107. The processing of FIG. 4 is then ended.

As is understood from Step S106 and Step S107 described above, the CPU 5 switches the start address array address 62 from a valid address to an invalid address when all of the startup processing 711 to the long-cycle control processing 716 finish being processed in the processing part activation operation.

The description given above focuses on the activation main processing 702 and the procedure of updating variables after the activation main processing 702 in the activation processing 70. The description takes secure boot processing executed for each processing part that is included in the control program 71 as a specific example of the activation main processing 702. The activation main processing 702, however, may be similar but different processing.

Figure 5:
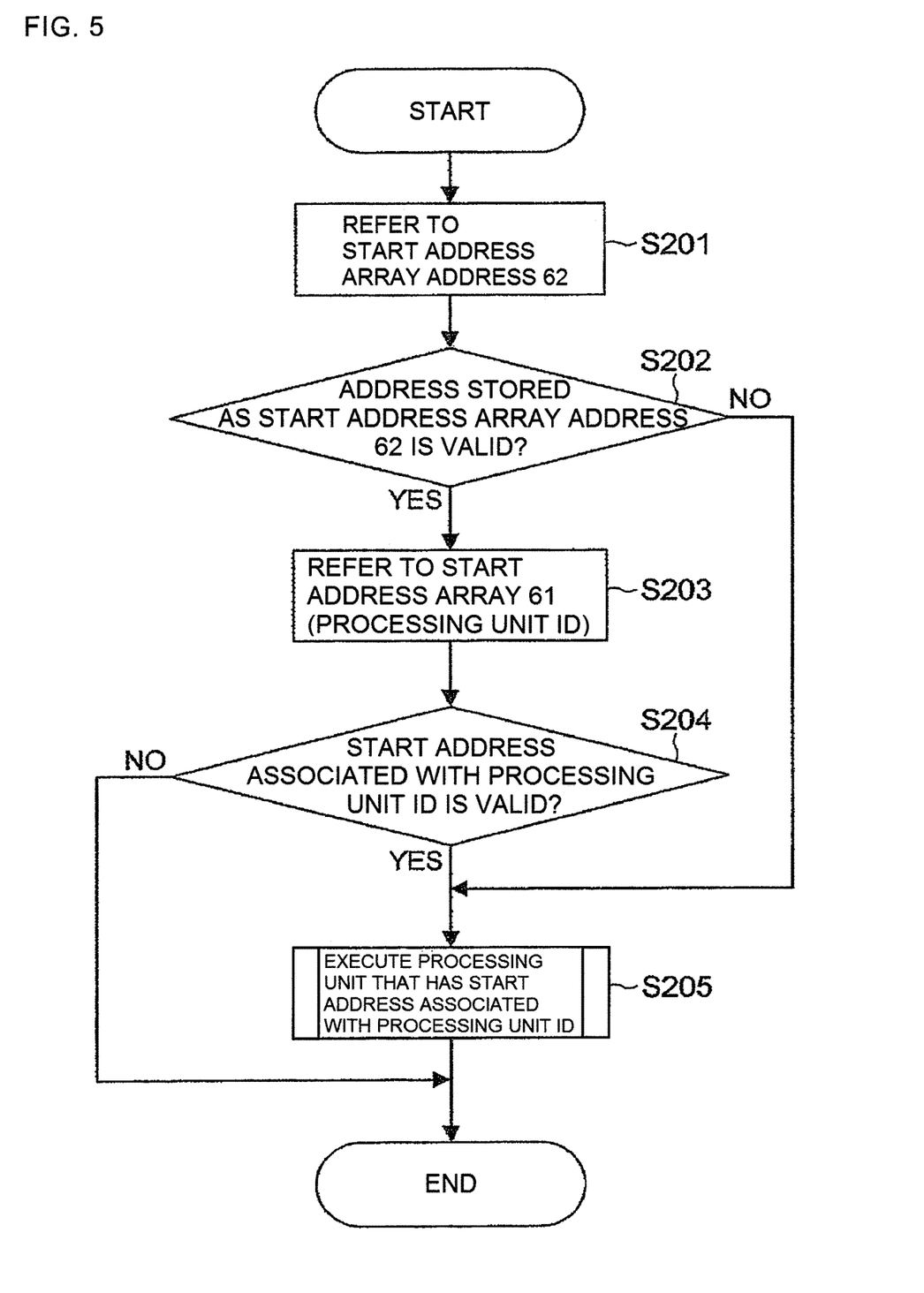
FIG. 5 is a flow chart for illustrating a processing procedure to be followed when another processing unit is executed during the execution of the control program in the first embodiment of the present invention.

The execution of a processing unit turned executable in a processing part for which the activation main processing 702 has been completed is described next with reference to FIG. 5. FIG. 5 is a flow chart for illustrating a processing procedure to be followed when, during the execution of one processing unit in the control program 71, another processing unit is executed in the first embodiment of the present invention.

In the first embodiment, the CPU 5 executes processing unit execution operation in which the start address array 61 is referred to and a processing unit that is associated with a start address switched to valid is executed, while executing the processing part activation operation described above. In other words, the CPU 5 sequentially executes processing units included in processing parts for which the activation main processing 702 has been completed, while executing the activation main processing 702 for each processing part of the control program 71.

As a first example, the execution of the control program 71 on a processing unit-by-processing unit basis may be executed by concurrent processing with the use of a CPU separate from the CPU that is executing the activation main processing 702. The CPU 5 in this case is configured to execute the processing part activation operation and the processing unit execution operation concurrently. The concurrent processing may be executed by another CPU or, when a multi-core CPU including a plurality of cores is used, by another core. As a second example, the timer 8 or other measures may be used to execute the activation main processing 702 and a processing unit by parallel processing in which the activation main processing 702 and the execution of a processing unit are switched on the same CPU each time a fixed length of time elapses. The CPU 5 in this case is configured to execute the processing part activation operation and the processing unit execution operation in parallel.

In the first embodiment, the control program 71 is sequentially executed in the order of processing units in processing parts for which the activation main processing 702 has been completed. However, there is a case in which a processing unit is being executed by the CPU 5 and another processing unit is called up and executed in the processing unit that is being executed. Examples of this case include a shift from one processing unit to the next processing unit in the same processing part, a shift from a processing unit at the tail end of one processing part to a processing unit at the head of the next processing part, and a shift from a processing unit of one processing part to a processing unit of another processing part. However, the another processing unit called up to be executed is executable only when the activation main processing 702 has been completed with respect to this processing unit.

In Step S201, when it is required to, during the execution of one of the processing units of the control program 71, call up and execute another processing unit, the CPU 5 refers to the start address array address 62 in the RAM 6. The processing of FIG. 5 then proceeds to Step S202. In Step S202, the CPU 5 determines whether an address that is stored as the start address array address 62 referred to in Step S201 is valid or invalid.

When it is determined in Step S202 that the start address array address 62 is a valid address, the processing of FIG. 5 proceeds to Step S203. In Step S203, the CPU 5 refers to the start address array 61 to check a start address that is associated with a processing unit ID already assigned to the processing unit to be called up and executed. The processing of FIG. 5 then proceeds to Step S204.

When it is determined in Step S202 that the start address array address 62 is an invalid address, on the other hand, it means that the activation main processing 702 has been completed for all processing parts of the control program 71. Accordingly, the processing of FIG. 5 proceeds to Step S205 without referring to the start address array 61. That is, reference to the start address array 61 in the first embodiment is ended and, from then on, the CPU 5 returns to an address reference method of the related art in which the valid start address array 704, for example, is referred to in order to execute a processing unit.

In Step S204, the CPU 5 determines whether the start address associated with the processing unit ID is valid or invalid, as a result of referring to the start address array 61 in Step S203. In other words, the CPU 5 determines whether the activation main processing 702 has been completed for one of the processing parts of the control program that includes the processing unit to be executed.

When the start address referred to is determined as valid, it means that the activation main processing 702 has been completed for the processing part that includes the processing unit to be executed, and the processing of FIG. 5 accordingly proceeds to Step S205. In Step S205, the CPU 5 permits the calling up of the another processing unit and executes the processing unit that has the start address associated with the processing unit ID.

When it is determined in Step S204 that the start address referred to is invalid, on the other hand, it means that the activation main processing 702 has not been completed for a processing part that includes the processing unit to be executed. The CPU 5 accordingly ends the processing of FIG. 5 without calling up this processing unit.

As is understood from Step S203 to Step S205 described above, the CPU 5 executes the processing unit execution operation in which the start address array 61 is referred to and a processing unit that is associated with a start address switched to valid is executed.

More specifically, as is understood from Step S201 to Step S205 described above, the CPU 5 executes a processing unit that is associated with a start address switched to valid by referring to the start address array 61 when the start address array address 62 is valid. As is understood from Step S201, Step S202, and Step S205, the CPU 5 stops referring to the start address array 61 and executes the processing unit when the start address array address 62 is invalid.

When a problem is expected to arise as a result of not calling up a processing unit requested to be called up, an initial value in the start address initial value array 703 that is associated with the requested processing unit is changed from an invalid address to an address for temporary execution processing. The activation main processing 702 is then executed for the temporary execution processing of the requested processing unit in advance. Alternatively, modification to avoid the problem may be made by changing the arrangement of the processing units in the control program 71 such that the activation main processing 702 is completed for the requested processing before the requested processing is called up, and then re-compiling and re-linking the control program 71.

As described above, according to the first embodiment, the ECU 1 includes: the ROM 7 storing the control program 71, which includes the startup processing 711 to the long-cycle control processing 716 as an example of a plurality of processing parts; the RAM 6 storing the start address array 61, which has, as an element, a start address of at least one processing unit included in each of the plurality of processing parts; and the CPU 5, which executes the control program 71. The plurality of processing parts of the control program 71 are arranged in the ROM 6 in ascending order of the lengths of activation time demanded of the processing parts to be ready for execution. The CPU 5 is configured to execute the processing unit execution operation while executing the processing part activation operation.

This enables the control program 71 to start execution of each processing part within a length of activation time demanded of the processing part, and to provide a requested function, despite incompletion of the activation main processing 702 in some areas of the control program 71. In other words, when the control program 71 is to be executed after the activation main processing 702 is performed on the control program 71, the time required for the control program 71 to be ready for execution can be kept from increasing.

When the ECU 1 is an in-vehicle electronic control device, the demanded length of activation time counted since an operation start command is issued until a function of controlling a control object, a function of holding communication to and from an external device, or other functions become ready to be provided is approximately 100 milliseconds. According to the first embodiment, this demand for the activation time can be fulfilled as well when the control program 71 is executed after the activation main processing 702 is executed.

In the description given above on the first embodiment, secure boot processing, which is check processing for examining the validity of the control program 71, is executed as an example of the activation main processing 702. As the activation main processing 702, transfer processing in which the control program 71 is transferred from the ROM 7 to the RAM 6 before the control program 71 is executed may be required in addition to the check processing.

For instance, when the microcontroller unit/microcomputer 3 has a system on a chip (SoC) configuration in which a system including a plurality of CPUs is integrated into one IC, one of the CPUs is set as a main CPU and the rest of the CPUs are set as sub-CPUs for control. The control program 71 read by the main CPU out of a ROM accessible to the main CPU or a secondary storage device may be required to be transferred by transfer processing to a RAM accessible to the sub-CPUs for control.

In this case, the main CPU executes the transfer processing as part of the activation main processing 702 to transfer the control program 71 stored in the ROM 7 or the secondary storage device to the RAM 6 on a processing part-by-processing part basis. The sub-CPUs for control can execute processing units starting from ones that are included in completely transferred processing parts. This means that the time required for the control program 71 to be ready for execution can be kept from increasing by transferring the control program 71 on a processing part-by-processing part basis with the use of the main CPU and executing processing units that are included in completely transferred processing parts with the use of the sub-CPUs in parallel to the transfer.

The ECU 1 described above may be configured from, for example, a single circuit, a composite circuit, a processor designed as a program, a processor designed as concurrent programs, an application-specific integrated circuit (ASIC), a field-programmable gate array (FPGA), or a combination thereof. The function of each component of the ECU 1 may be implemented by an individual processing circuit, or the functions of the components may be implemented together by a single processing circuit.

What is claimed is:

1. An electronic control device, comprising:
   a first storage configured to store a control program including a plurality of processing parts;
   a second storage configured to store a start address array including, as an element, a start address of at least one processing unit included in each of the plurality of processing parts; and
   a controller configured to execute the control program,
   wherein the plurality of processing parts are arranged in ascending order of lengths of activation time demanded of the plurality of processing parts to be ready for execution, and
   wherein the controller is configured to execute processing unit execution operation while executing processing part activation operation,
      the processing part activation operation including performing activation main processing for each of the plurality of processing parts, and switching the start address of each processing unit that is included in one of the processing parts for which the activation main processing has been completed from invalid to valid, in the order of arrangement of the plurality of processing parts,
      the processing unit execution operation including referring to the start address array and executing the processing unit that has the start address switched to valid.

2. The electronic control device according to claim 1, wherein the controller is configured to execute the processing part activation operation and the processing unit execution operation in parallel.

3. The electronic control device according to claim 2,
   wherein the second storage is configured to further store a start address array address being a start address of the start address array, and
   wherein the controller is configured to:
      switch the start address array address from valid to invalid when the execution of the processing part activation operation is finished for all of the plurality of processing parts;
      refer to the start address array and execute the processing unit that has the start address switched to valid when the start address array address is valid; and
      stop referring to the start address array and execute the processing unit when the start address array address is invalid.

4. The electronic control device according to claim 1, wherein the controller is configured to execute the processing part activation operation and the processing unit execution operation concurrently.

5. The electronic control device according to claim 4,
   wherein the second storage is configured to further store a start address array address being a start address of the start address array, and
   wherein the controller is configured to:
      switch the start address array address from valid to invalid when the execution of the processing part activation operation is finished for all of the plurality of processing parts;
      refer to the start address array and execute the processing unit that has the start address switched to valid when the start address array address is valid; and
      stop referring to the start address array and execute the processing unit when the start address array address is invalid.

6. The electronic control device according to claim 1,
   wherein the second storage is configured to further store a start address array address being a start address of the start address array, and
   wherein the controller is configured to:
      switch the start address array address from valid to invalid when the execution of the processing part activation operation is finished for all of the plurality of processing parts;
      refer to the start address array and execute the processing unit that has the start address switched to valid when the start address array address is valid; and
      stop referring to the start address array and execute the processing unit when the start address array address is invalid.

* * * * *